ULTRA-HIGH FREQUENCY MULTI-SECTION TUNER

Filed Jan. 25, 1954 4 Sheets-Sheet 1

INVENTOR.
Edward D. Chalmers
BY
Robert L. Kahn
Atty.

ULTRA-HIGH FREQUENCY MULTI-SECTION TUNER

Filed Jan. 25, 1954 4 Sheets-Sheet 2

INVENTOR.
Edward D. Chalmers.
BY.
Robert L. Kahn
Atty.

INVENTOR.
Edward D. Chalmers
BY
Robert L Kahn
Atty.

Feb. 25, 1958 E. D. CHALMERS 2,824,965

ULTRA-HIGH FREQUENCY MULTI-SECTION TUNER

Filed Jan. 25, 1954 4 Sheets-Sheet 4

INVENTOR.
Edward D. Chalmers
BY. Robert L. Kahn
Atty.

United States Patent Office 2,824,965

Patented Feb. 25, 1958

2,824,965

ULTRA-HIGH FREQUENCY MULTI-SECTION TUNER

Edward D. Chalmers, Evanston, Ill., assignor to Oak Mfg. Co., Chicago, Ill., a corporation of Illinois Application January 25, 1954, Serial No. 405,964

17 Claims. (Cl. 250—40)

This invention relates to an ultra-high frequency multi-section tuner, and more particlularly to a type of tuner utilizing coaxial elements as resonant circuits for handling ultra high frequency signals ranging from the order of about 470 megacycles to about 890 megacycles. These frequencies are the end frequencies for the television channels ranging from 14 to 83, as assigned by the F. C. C.

The range given here is exemplary and by varying design dimensions and proportions, certain changes in the frequencies to be handled may be obtained.

The frequencies in the range specified above are generally designated as ultra high frequencies, abbreviated to U. H. F. The lower television frequencies ranging from channels 2 to 13 inclusive are generally referred to as very high frequencies, indicated for short as V. H. F.

It is known that the function of a tuner is that of selecting a desired signal, amplifying said signal if possible, and generally where superheterodyne reception is employed, the tuner also includes means for converting the signal to an intermediate frequency (I. F.).

In order to obtain the desired selectivity, it is usually necessary to have at least two cascaded signal tuner sections in a practical U. H. F. tuner. Equally loaded circuits are desirable. The character of the coupling between cascaded tuner sections in the U. H. F. band is important from the point of view of efficiency and from the point of view of obtaining a desired band pass shape. Furthermore, the shape of the output frequency band from the U. H. F. tuner should preferably remain substantially constant over the U. H. F. tunable range in order that the derived I. F. band will have uniform band width and a uniform amplitude characteristic.

As is well known from theoretical considerations of coupled circuits, the desired degree of coupling for band pass operation is a rather precise quantity and a comparatively small change in the co-efficient of coupling or character of coupling will have a marked effect on the tuner output characteristic.

As an example, either critical or transitional coupling (depending upon desired tuner operation) is usually required for maximum signal transfer and this requirement must be maintained over the entire tuning range of the U. H. F. tuner for optimum performance.

In coaxial element tuners, to which type the invention here pertains, conventional means for coupling tuned signal circuits often involves the use of windows in the metal walls separating tuner sections. In the U. H. F. range, physical dimensions of every tuner part have a substantial effect on tuner operation. In addition, the nature of the load (antenna system) facing the tuner U. H. F. signal input, as well as the nature of the load facing the tuner U. H. F. output (the mixer and oscillator circuits) have a substantial effect on the operation of a tuner. Changes in the aforementioned loadings, whether intentional or inadvertent, require a difference in the physical make-up of the tuner parts controlling coupling for optimum performance. In addition, manufacturing tolerances in conventional tuners, if substantial, may introduce undesired variations in the coupling between sections.

This invention makes it possible to provide a tuner wherein readily adjustable controls are provided for varying the amount of coupling between tuned U. H. F. signal sections thereby providing means for maintaining efficient operation of the tuner. The said coupling controls have by design a sufficient range to compensate for substantial manufacturing tolerances and/or to compensate for sizable variations in loading at either the input or output of the U. H. F. tuner signal selectors.

A tuner embodying the present invention provides for a pair of cascaded U. H. F. signal sections, each section consisting of a coaxial type cavity having a variable capacitive loading at the high potential end thereof for tuning same. Each cavity has an inner conductor, one end of the conductor being at the shorted or low potential end of the cavity and the other end of the conductor being at the open or high potential end of the cavity.

In accordance with this invention there is provided an adjustable mutual impedance in the partition wall separating the cascaded tuned signal sections, said mutual impedance being disposed at or near the low potential end of the cavity and operating in the magnetic field. This adjustable mutual impedance has its maximum effect at the high frequency end of the tuner range, the coupling increasing as the frequency increases.

This invention also provides for an adjustable mutual impedance in the partition wall between adjacent cascaded signal tuner sections, this last named mutual impedance, however, being disposed near the high potential end of the cavity and being disposed in the return current path of the two signal variable tuning capacitors. This last named mutual impedance has its maximum effect at the low frequency end of the tuning range, the coupling dropping off as the tuned frequency increases.

It is understood, of course, that the desired tuned frequency is controlled by the setting of the variable capacitor loading on each signal tuner section, and synchronous tuning is maintained in normal operation.

By providing the two independently adjustable mutual impedances at two regions of coupling between cascaded signal tuner sections, it is possible to obtain a composite coupling having a desirable overall frequency characteristic. By proper design of the respective coupling means, as well as adjustment of the individual mutual impedances, constant coupling and hence optimized tuner performance may be obtained in the presence of loading variations which normally result in loss of performance as the tuner ranges over the entire U. H. F. band. It is further noted that the two respective coupling adjustments may also be employed as means for providing constant or intentionally varying band width over the tuning range. The nature of coupling adjustments is such that adjustments may be made without disturbing the synchronous tuning of the respective signal tuner sections.

In order that the invention may be fully understood, it will now be explained in connection with the drawings wherein exemplary embodiments are illustrated. It is understood, however, that the invention may assume a variety of forms and that such forms are within the scope of the invention as defined by the appended claims.

Referring to the drawings:

Figure 3 is a top plan view of the tuner illustrated in

Figure 2:
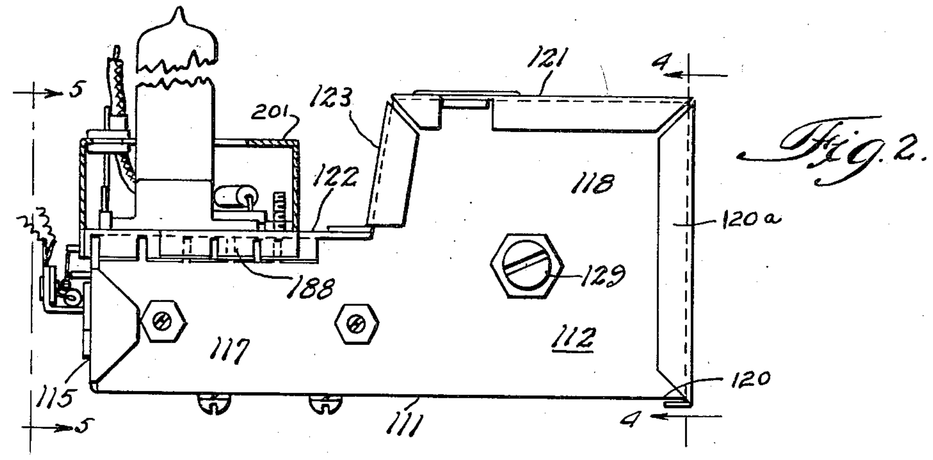
Figure 2 is a side view of one form of tuner embodying the present invention, said parts being broken away for purposes of illustration.

Figure 2 with the top cover plates being removed to show the interior construction.

Figure 4:
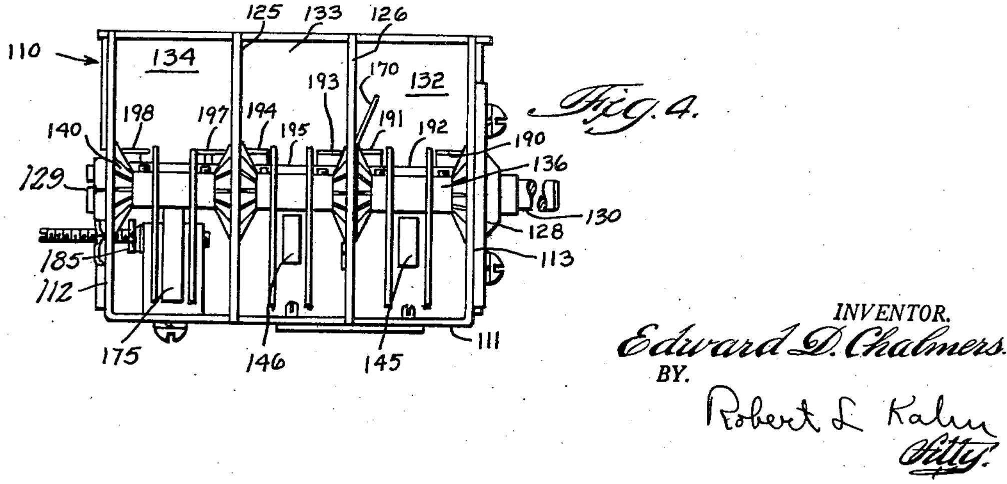

Figure 4 is an end view of the tuner illustrated in Figure 2 with the end cover plate removed, the view being taken along line 4—4 of Figure 2.

Figures 5, 6, 7, 11, 12:
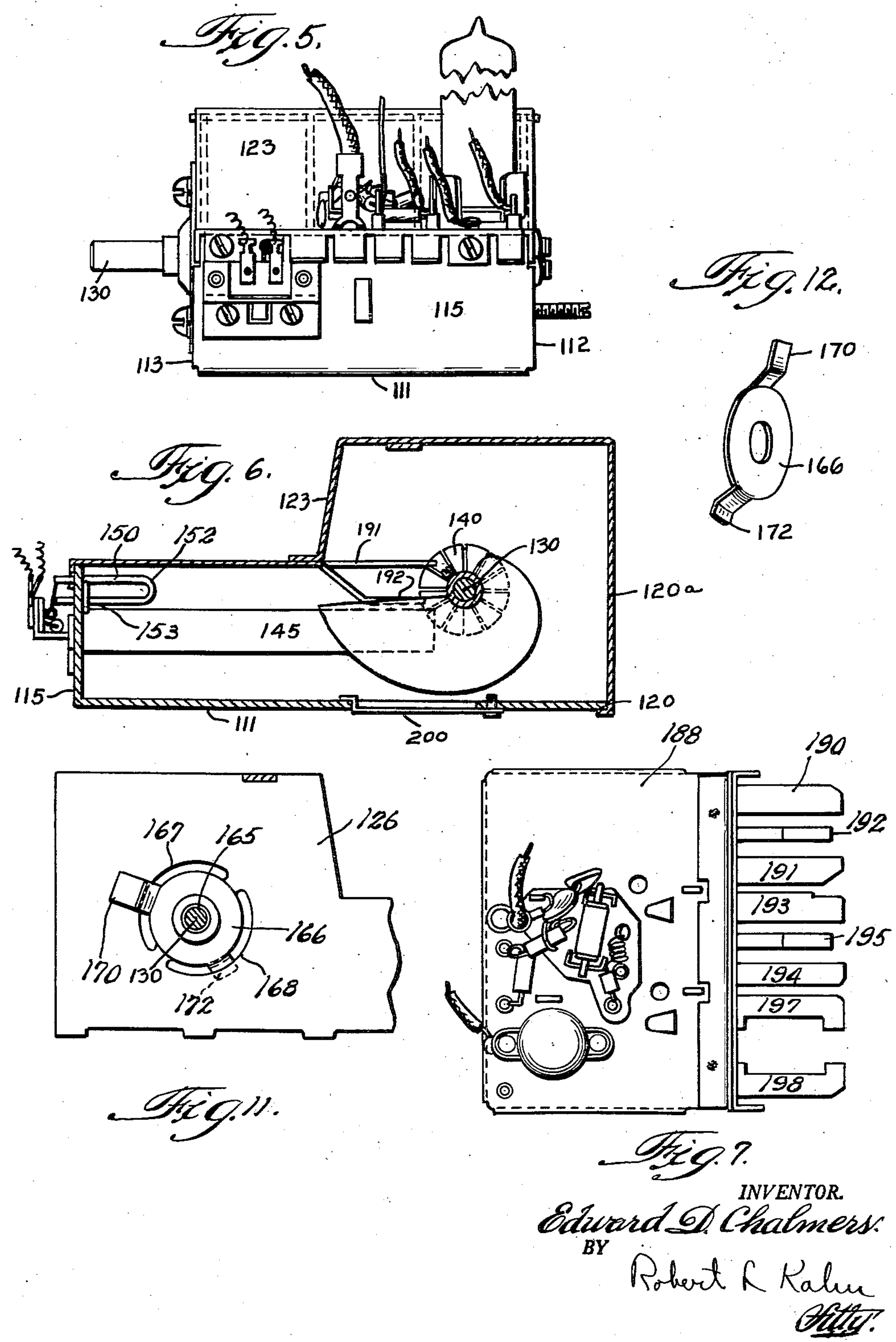

Figure 5 is an end view of the tuner illustrated in Figure 2, this view, however, being taken from a direction opposite to Figure 4, the view being taken as illustrated along line 5—5 of Figure 2.

Figure 3:
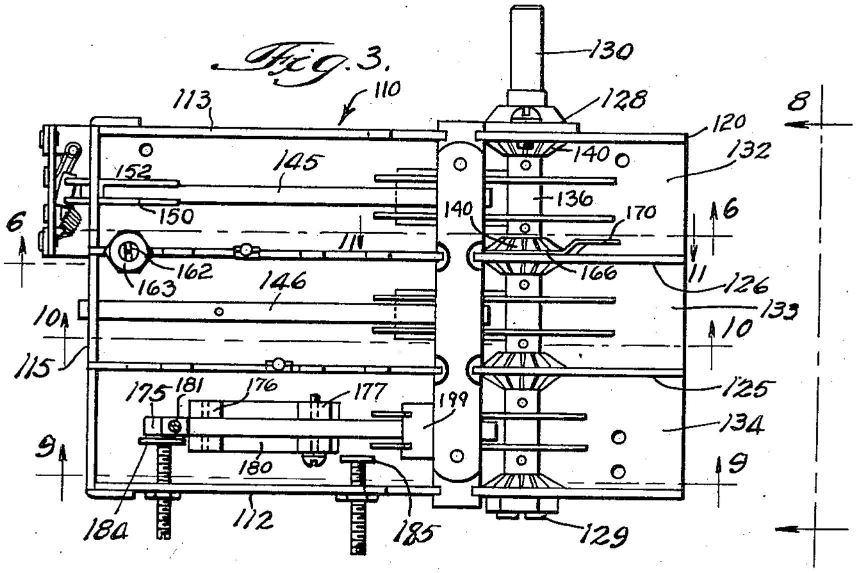

Figure 6 is a section taken along line 6—6 of Figure 3 and illustrates the tuner section having the antenna input.

Figure 7 is a top plan view of that part of the cover plate of the tuner carrying the oscillator vacuum tube and the various connecting circuit components, the cover being removed to illustrate the various parts.

Figure 8:
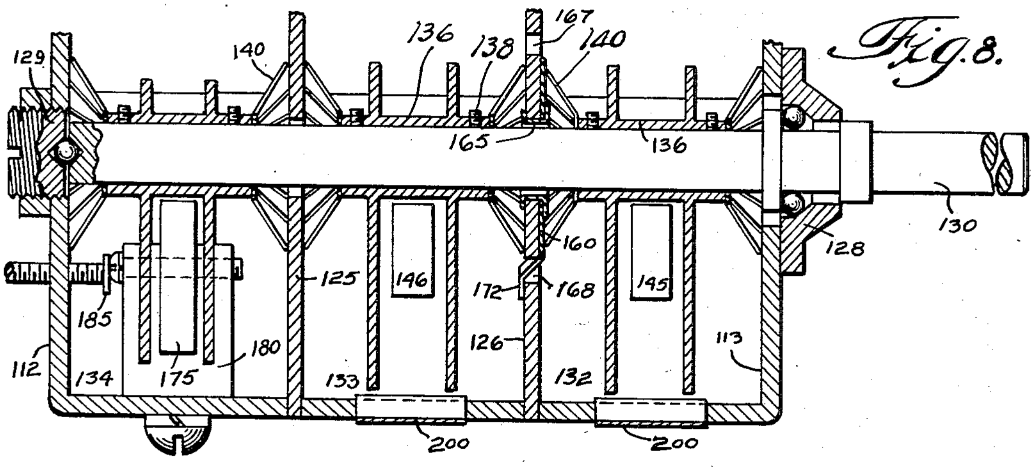

Figure 8 is a transverse sectional view along line 8—8 of Figure 3 and illustrates the wiper means for grounding the rotors.

Figure 9:
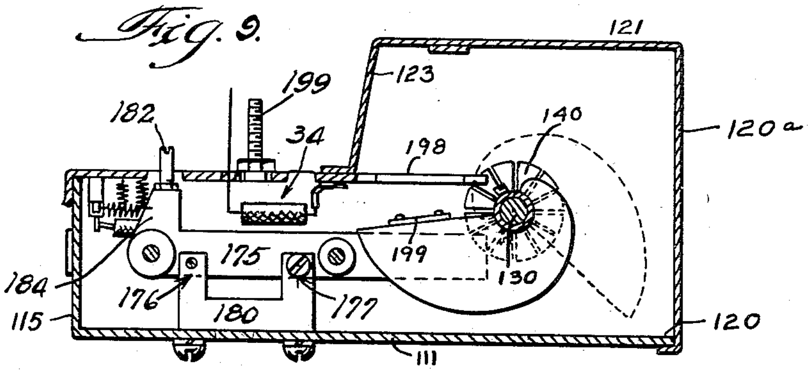

Figure 9 is a section along line 9—9 of Figure 3 and illustrates the mounting of the axial conductor in the oscillator section of the tuner.

Figure 10:
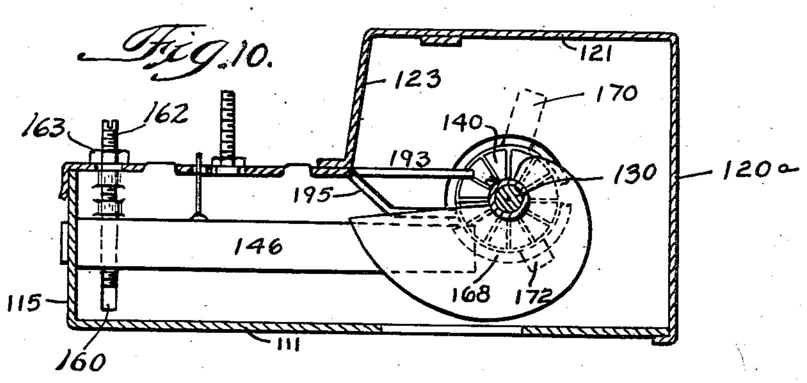

Figure 10 is a section along line 10—10 of Figure 3 and illustrates the adjustable means for obtaining magnetic field coupling between cascaded high frequency tuner sections.

Figure 11 is a sectional detail of the adjustable means for controlling the coupling between cascaded tuner sections near the high potential end of the axial conductor.

Figure 12 is an isometric detail of the adjusting member for the adjusting means illustrated in Figure 10.

Figures 1, 13, 14, 15, 16, 17:
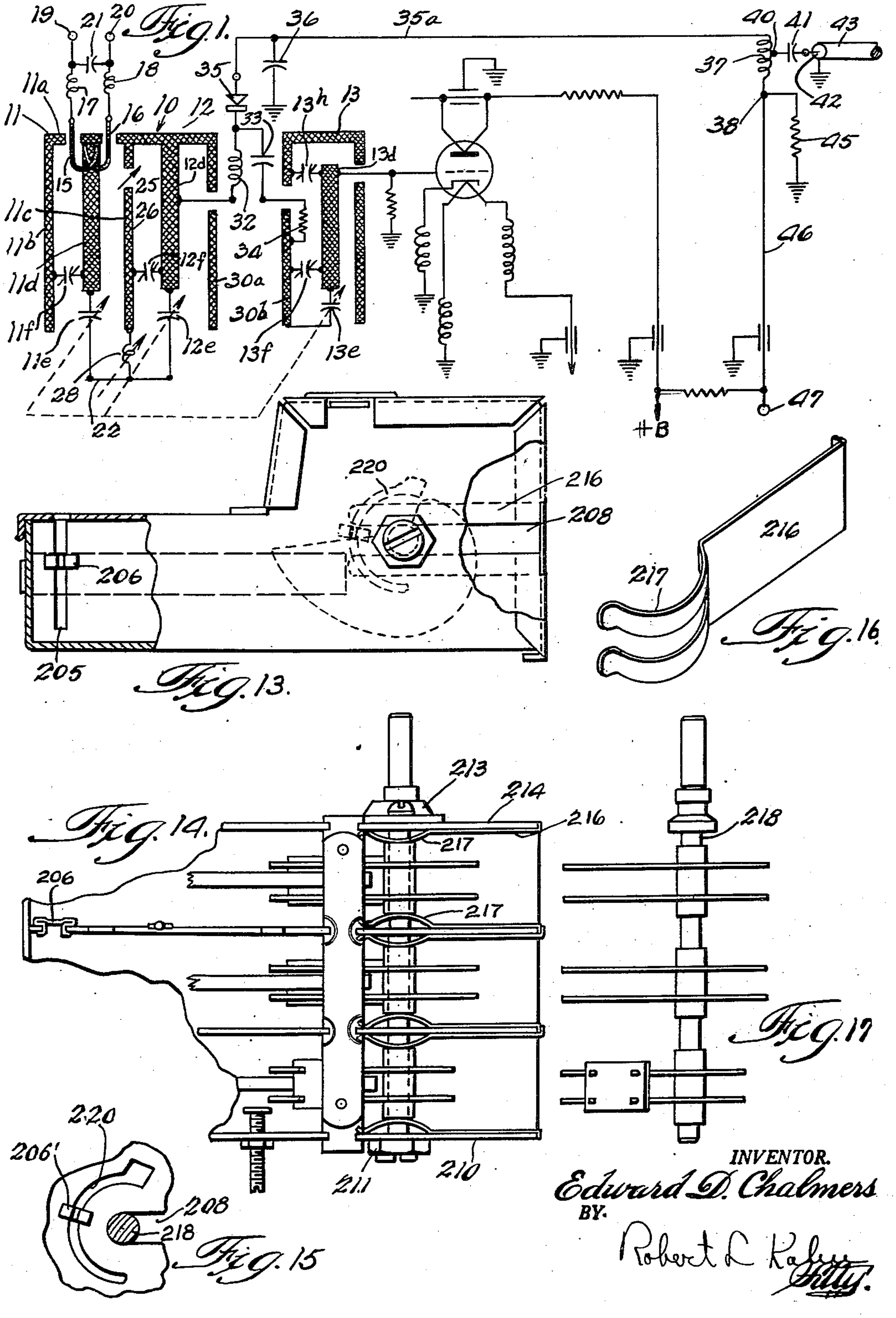
Figure 1 is a diagrammatic illustration of a tuner embodying the present invention.

Figure 13 is a side elevation with certain parts broken away of a modified tuner embodying the present invention, the rotor being out.

Figure 14 is a top plan view of the tuner illustrated in Figure 13.

Figure 15 is a detail of the adjusting means for controlling the transfer of energy between adjacent tuner sections of the modifications.

Figure 16 is an isometric view of one of the rotor wipers for grounding the same to the frame, in the modified construction.

Figure 17 is a top plan view of the rotor portion of the tuner illustrated in Figure 14.

Referring first to Figure 1, there is shown in cross-hatched section the various boundary walls of a three-section tuner with connections to various portions of a circuit and load to illustrate the manner in which the tuner may be used. The tuner is generally indicated by 10 and has sections 11, 12 and 13 respectively. Each of these tuner sections is of the coaxial type wherein a cavity is formed of metal having excellent electrical conductivity. The cavity has substantially greater length than transverse width or depth. The cavity is also provided with a coaxial conductor extending generally along the axis of the cavity. The invention is particularly concerned with the coupling between tuner sections 11 and 12. Tuner section 13 provides a tank circuit for an oscillator and the construction of this section may follow conventional lines, although certain novel details are disclosed and form a part of the present invention.

Referring specifically to tuner section 11 as an example, this section has end wall 11*a* and side walls 11*b* and 11*c* respectively. The top and bottom walls of the cavity are not shown, a structural or physical embodiment of the cavity being described later and showing such walls. Axially disposed of the cavity is central conductor 11*d*. Axial conductor 11*d* is electrically and mechanically joined to cavity wall 11*a*. This end of the cavity is the low potential end where the amplitude of potential variation is minimum. Direct metallic contact between the axial conductor and the cavity at that point is provided for the proper operation of the cavity.

As will be readily understood, the length of the cavity is determined in relation to the frequency range to be covered. While not shown, the end of the cavity opposite to 11*a*, or the bottom of the figure as illustrated in the drawing, is also enclosed by a suitable conducting wall.

As may be readily appreciated, the length of the cavity, that is, the electrical length from wall 11*a* to the open end of the inner coaxial conductor as illustrated in the drawing, is one-quarter of a wave length in a normal mode of operation for a frequency slightly higher than the highest frequency to be tuned.

In order to control the resonant frequency of the cavity and thus tune the same, there is provided capacitive loading in the form of condensers 11*e* and 11*f*. Variable capacitor 11*f* is between axial conductor 11*d* and the cavity wall, in this instance side 11*b*, and constitutes an adjustment of the minimum capacitance to ground at or near the high potential end of the axial conductor. Turning capacitor 11*e* is in series between axial conductor 11*d* and an inductance generally indicated by 28 connected to cavity wall 11*c*. The practical embodiments of the invention, as illustrated and described, also have structural elements connecting capacitor 11*e* and wall 11*b*, which elements in practice contain inductance.

In order to introduce high frequency energy into section 11 of the tuner, loops 15 and 16 are provided, these being disposed as shown near low potential end 11*a* of the cavity and in proximity to axial conductor 11*d*. One end of each of loops 15 and 16 is electrically connected to wall 11*a* while the other end passes through openings on each side of the axial conductor. Loops 15 and 16 are connected through suitable inductances 17 and 18 to antenna terminals 19 and 20 for connection to a suitable antenna system. Capacitor 21 is connected across the antenna terminals. Inductances 15 and 16 in conjunction with capacitor 21 control antenna loading.

Referring to the bottom end of the cavity, capacitor 11*e* is connected to part 22 which, in practice, is part of the common partition wall between adjacent tuner cavities. Capacitor 11*e* and part 22 are also connected to the remaining cavity walls but this is not shown for clarity.

Section 11, in a manner which is well understood in the art, acts to select a certain band of frequencies within the tunable range thereof, the actual selected frequency or frequencies being determined by the setting of the variable capacitors. It is necessary to feed the tuned energy from section 11 to section 12. For this purpose and in accordance with the present invention, an adjustable coupling means generally illustrated by numeral 25 is provided at or near the low potential end of the cavity, namely wall 11*a*. Means 25 is adjustable for the purpose of determining the overall coupling characteristic of the entire tuner and normally means 25 is not changed during the operation of the tuner. Under normal conditions, means 25 may be considered an adjustment to be made at the factory or by a service man and not by any user unless such user is technically qualified and has the proper knowledge and facilities for determining the energy transfer characteristic incident to a particular setting. Means 25 is disposed in dividing wall 26 between adjacent sections 11 and 12. Means 25 acts on the magnetic field component of the energy within section 11 being transferred to section 12.

There is also provided a coupling means between adjacent tuner sections near the cavity end adjacent to the high potential end of the axial conductor. This coupling means, indicated generally as variable impedance 28, is in the common current return path between the high potential end of the axial conductor and the cavity walls proper. As with means 25, variable impedance 28 is not to be changed ordinarily during tuner use and constitutes a permanent setting. By a combination of settings of means 25 and 28, the overall energy transmission characteristics between sections 11 and 12 of the tuner may be controlled to give desired tuner characteristics.

Section 12 of the tuner is generally similar to section 11 of the tuner. Variable capacitor 12*e* is mechanically coupled to variable capacitor 11*e* of section 11 so that the two may operate as a unit. Variable capacitor 12*f* merely constitutes an adjustable capacitor for adjusting the minimum capacitance to ground of the axial conductor and resembles capacitor 11*f* in section 11.

Section 12 of the tuner has dividing wall 30*a* while section 13 of the tuner has dividing wall 30*b*. In the actual construction of the tuner, these two walls are constituted by one thickness of metal and the tuner sections are physically disposed adjacent each other in the same manner as illustrated in connection with sections 11 and 12. However, for convenience in illustrating, section 13 of the tuner has been physically separated.

Tuner walls 30*a* and 30*b* each have apertures as illustrated for providing electrical connection between the two tuner cavities. In section 12 of the tuner, a direct metallic connection is provided to the lower terminal of inductor 32. Inductor 32 provides a means for crystal loading on section 12. The other or top terminal of inductor 32 is connected through coupling capacitor 33 and resistive pick-up inductor 34 to the inside wall of the cavity for section 13 of the tuner. This tuner section acts as a tank circuit and inductor 34 is disposed in proximity to an intermediate part of the axial conductor 13*d* for transfer of oscillator energy to crystal mixer diode 35. The top terminal of inductor 32 is also connected to crystal diode or mixer 35 and thence to wire 35*a*. Wire 35*a* has condenser 36 connected between it and the ground. Condenser 36 serves as an R. F. and oscillator energy return path and resonates inductor 37 to I. F. Wire 35*a* is connected through inductor 37 to junction point 38. At intermediate point 40 on inductor 37, a connection is made through blocking condenser 41 to inner conductor 42 of coaxial line 43, the outside of the line being grounded. The coaxial line conducts intermediate frequency energy to a suitable band filter or tuning means so that the intermediate frequency output from the tuner herein described may be handled by more or less conventional apparatus. It is understood that the desired intermediate frequency output does not vary in the frequency spectrum and that this intermediate frequency is lower than any frequency to be tuned by sections 11 and 12 of the tuner.

Junction 38 is connected through dropping resistor 45 to ground and is also connected through central conductor 46 of a grounded coaxial line to test point 47.

The remaining connections to a triode oscillator tube may be conventional. The anode may be connected by two leads to reduce inductance.

In order to maintain oscillation within tuner section 13, it is necessary to electrically insulate axial conductor 13*d* from the cavity wall of section 13 for direct current. Capacitor 13*e* is disposed between the end of axial conductor 13*d* and the lower end of the cavity wall, the capacitor control being mechanically coupled to the two variable capacitors 11*e* and 12*e*. Variable capacitors 13*f* and 13*h* are provided between the axial conductor 13*d* and the cavity wall. It will be noted that these capacitors are disposed at or near the two ends of the axial conductor. Capacitor 13*h* is provided for the purpose of setting the low frequency end of the oscillator tuning range. Capacitor 13*f* is used for setting the high frequency end of the oscillator tuning range.

A practical construction corresponding to the showing in Figure 1 will now be described in connection with Figures 2 to 12 inclusive.

The tuner generally has frame 110 having bottom 111, sides 112 and 113, and end 115. Sides 112 and 113 have the shape generally illustrated, this shape generally resembling an L consisting of relatively narrow portion 117 and relatively wide portion 118. Frame 110 has end 120 and the top consisting of portions 121 and 122 connected by sloping portion 123 and end portion 120*a*. The frame sides are adapted to be covered by one or more suitably shaped metal plates which snugly fit against the frame to provide mechanical and electrical shielding for the entire construction.

It is understood that the frame is made of sufficiently heavy metal so that the various parts will remain rigidly in position. The frame as a whole may be made of steel with the surfaces, both inside and outside, copper-plated. For the frequencies involved, the copper plating is sufficiently thick so that high frequency currents will be confined to the copper layer.

Between sides 112 and 113 of the frame and parallel thereto are metal partition plates 125 and 126, these plates generally having the same shape as end plates 112 and 113. These partition plates may also be of steel with a heavy plate of copper.

Portions 118 of end plates 112 and 113 have journals or bearings 128 and 129 for accommodating rotor shaft 130. Rotor shaft 130 is of metal, such as steel, and is so supported in end plates 112 and 113 as to be capable of rotary movement but incapable of any longitudinal movement. Partition plates 125 and 126 are suitably apertured to accommodate shaft 130.

The frame as illustrated is divided by the partitions into three parallel compartments of cavities 132, 133 and 134. Between the opposed walls of each cavity, shaft 130 carries sleeve 136, the sleeve carrying suitable rotor plates. Cavities 132, 133 and 134 have two rotor blades or vanes. Each sleeve 136 and corresponding set of rotor blades are rigidly united. Both the sleeve and the rotor blades may be made of any suitable metal and the rotor assembly is provided with a suitable surface having low electrical resistance such as a copper plate. Each rotor assembly is rigidly attached to shaft 130 by means of suitable set screws 138.

Each sleeve carries at each end a wiper assembly generally indicated by 140 and having the general shape of a tapered annular series of fan shaped segments or leaves. The wipers thus formed, which are preferably of Phosphor-bronze and silver-plated, press against the metal forming the cavity. Thus excellent electrical contact is established between the rotors and rotor sleeve on the one hand and the cavity sides on the other, by means of the wiper assemblies.

The rotors for cavities 132 and 133 have the general shape illustrated and these rotor plates may have peripheral slots extending inwardly from the edge and generally toward the center of the shaft. Such a construction is common in the variable condenser art and is provided for the purpose of making individual adjustment of the part of the rotor blade between adjacent slots to control tracking characteristics. In practice, the various rotor parts may be bent transversely of the planes of the rotor blades to secure the desired tracking characteristics. Cavities 132 and 133 are for desired signal preselection and require coupling therebetween. Instead of two cascaded cavities for preselection, three or more may be provided, the adjacent cavities being coupled by means similar to those herein disclosed between cavities 132 and 133.

The rotor blades for cavity 134 for the oscillator may generally be solid, although if desired these may be slotted, too. The general arrangement of rotor slots is such as to permit tracking of the oscillator and preselector rotor sections. It is not necessary that the rotor blades of one tuning section be equal in shape or size to the rotor blades of another tuning section. The dimensions of the cavity and rotor blades are so designed as to provide a desired angular range of travel for the rotor, this generally consisting of about 200 degrees. However, this angular range is merely exemplary and in practice the range will be adjusted to suit desired requirements.

Cavities 132 and 133 each have axial conductors 145 and 146 respectively. These two conductors may be similar in size and are rigidly supported from plate 115.

These conductors are relatively rigid, the ends of the conductors being firmly set into slots in cavity wall 15. Any other means of support may be provided. No attempt is made to provide any kind of electrical insulation in the conventional sense between the ends of the axial conductors and cavity wall 115. The axial conductors, like the other parts of the cavity, have a low resistance metallic surface which may be copper plate on a steel structure.

Axial conductors 145 and 146 extend toward and have generally flat faces symmetrically disposed with respect to the two rotor blades forming the rotor assembly in each cavity. The axial conductor is normally disposed below the center of shaft 130 as seen from an end of the tuner. The axial conductor is also disposed so that when looking down upon the tuner as seen in Figure 3, for example, the free high potential end of the axial conductor stops short of the rotor sleeve.

Cavity 132 is normally the first tuning cavity and is supplied with high frequency energy from a suitable antenna system or other source of energy. The high frequency energy is conducted to the tuner by means of any suitable type of transmission line, such as for example, 2-wire line of the balanced type. The end of the line is coupled to wires extending through end plate 115, the plate having a suitable aperture therethrough for clearing the wires, and terminating in flat loops 150 and 152 (Fig. 6) having ends firmly attached to and electrically connected to the inside surface of plate 115 at 153 in a manner corresponding to the showing in Figure 1.

In order to provide magnetic field coupling between cavities 132 and 133, partition plate 126 is provided with a slot or window 160 (Fig. 10) close to that part of the cavity near the inside surface of plate 115. The size of the window connecting the two cavities may be controlled in any suitable manner. A convenient means for controlling the size is provided by having bolt 162 cooperate with nut 163 rigidly secured to the top of partition 126. Bolt 162 has a threaded part thereof so dimensioned as to snugly fit window 160, the metal forming the sides of the window being conveniently cut to engage the threading of the bolt. It is essential that the bolt threads engage the slot sides so that at least the bolt end provides an electrically conductive connection across the slot.

At the end of the cavity adjacent plate 115, currents at high frequency have their maximum amplitude while the range of potential variation is a minimum. At this end of the cavity, therefore, any window between adjacent cavities will permit magnetic fields to pass from one cavity to another and thus provide magnetic field coupling.

Window 160 and the adjusting means therefor constitute a coupling impedance between the cascaded tuner sections. This coupling impedance is necessarily located at or near the low potential end of the axial conductor. Such a coupling impedance is more effective at the high frequency end of the tuning range. A different coupling impedance is provided at the cavity wall near the high potential end of the axial conductor and this impedance is more effective at the low frequency end of the tuning range.

Thus referring to Figure 11, partition 126, at the clearance opening surrounding the shaft, has eyelet 165. Eyelet 165 provides a rotatable support for disc 166, preferably of Phosphor-bronze. Disc 166 is somewhat larger than the circle subtended by wiper assembly 140 (Figure 8). Just beyond the edge of disc 166, the partition plate is cut to form two oppositely disposed arcuate slots 167 and 168. The ends of slots 167 and 168 are separated by sufficient partition metal so that the part of the partition plate almost enclosed by the slots is rigid and self-sustaining. The radial width of the two slots may be about $\frac{3}{32}$ of an inch, as an example, although this dimension is not critical. In fact, the dimension will depend upon various factors, such as the cavity dimensions, tolerances, the range of adjustment desired, and other factors. In general, the width of the two arcuate slots and circumferential size will be sufficient so that the parts to be described may be adjusted. Disc 166 may be disposed on either side of the partition plate.

Disc 166 is provided with finger piece 170 so that the disc may be rotatively adjusted to any desired position. Preferably, disc 166 is supported in such manner that it is frictionally retained in position and will not be turned except by suitable force applied to the finger piece. Disc 166 is also provided with wiper 172 extending through one of the arcuate slots and riding upon the surface of the partition plate on the other side of the plate from disc 166. Wiper 172 bears upon the partition plate outside of the arcuate slot. Arcuate slots 167 and 168 are so oriented that when wiper 172 is between the center of the rotor shaft and plate 115 (Fig. 11) of the tuner, disc 166 will be near one end of its range of adjustment. In this position of the wiper, minimum coupling through slots 167 and 168 occurs. When disc 166 is turned so that wiper 172 moves away from this minimum position, increased coupling is provided. The angular extent and orientation of the two arcuate slots will therefore be determined by the desired range of adjustment from a minimum position. It is generally immaterial whether coupling disc 166 is turned in one direction or the other away from the minimum coupling position. Two discs and wipers may be provided.

In general, it is immaterial on which side of the metal wall wiper 172 is disposed. The construction disclosed herein provides satisfactory contact action.

In cavity 134 where oscillations are to be maintained, axial conductor 175 is to be insulated from the cavity as far as direct current is concerned. To this end, axial conductor 175 is supported at two points, 176 and 177 (Fig. 9) by insulating block 180 bolted to the bottom of the frame. Block 180 is of Lucite or other low loss insulating material. Axial conductor 175 has portion 181 extending upwardly and tapped to receive terminal screw 182. A connection between the control grid of the triode oscillator and terminal screw 182 may be provided. Trimmer condenser plates 184 and 185 for low and high frequency adjustments are carried by bolts threadedly mounted in the side of the cavity and extending toward the two ends of the axial conductor.

The various axial conductors may be supported against vibration by blocks of suitable insulation disposed beneath the same near the high frequency high potential end of the conductor. Cover plate 188 carries the oscillator tube and the various resistors and inductors and crystal rectifier required. Cover plate 188 has a number of spring fingers extneding into the cavities. Spring fingers 190 and 191 extend into cavity 132 and form a partial top for the cavity region (Fig. 6). It will be noted that fingers 190 and 191 extend generally straight from plate 188. Between fingers 190 and 191 is spring finger 192 bent downwardly to a suitable distance from the top narrow side of the axial conductor at the high frequency high potential end thereof. The clearance between finger 192 and the axial conductor is a factor in determining the tuning of the cavity. This finger may be easily adjusted after the tuner is completed and being tested. The spacing between finger 192 and cavity defining fingers 190 and 191 is sufficient to permit the rotor vanes to pass through the same.

Plate 188 carries fingers 193 to 195 inclusive for cavity 133, these fingers being substantially the same as the first fingers described. Plate 188 also carries fingers 197 and 198 for the oscillator cavity. These two fingers extend straight out.

One or more of the groups of rotor blades may have an insulating comb 199 (Fig. 3) extending across the group to act as a stop and limit the rotation of the rotor.

Such a construction is well known in conventional variable condensers.

Additional cover plates 200 and 201 may be provided for the tuner frame and for the oscillator circuit components respectively.

In the construction so far described, the rotor cannot be disposed within the tuner as a complete unit. Instead, each rotor section must be disposed within the cavity and then the operating shaft threaded through the various rotor sections and bolted in place. In order to provide a construction which may be assembled more easily, the construction illustrated in Figures 13 to 17 inclusive is provided. A modified form of magnetic field coupling between tuner sections is also illustrated.

Referring to Figures 13 to 17 inclusive, vertical slot 205 in the partition wall between adjacent tuner sections is provided, as before. Spring clip 206 is disposed in the slot, this spring clip providing a small bridge of metal across the slot and being readily adjustable along the slot. It has been found that with the spring clip disposed at a certain point on the slot, generally about halfway down the cavity side, minimum coupling is provided. Movement of the clip either up or down from this position tends to increase the coupling. The width of the clip, that is, the dimension parallel to the slot length, may vary and it has been found that even a wire clip will work. Good electrical contact between the clip and slot sides is essential. Hence the clip may be of Phosphor-bronze with silver plate thereover.

In order to render the rotor assembly removable as a unit, all the partitions between adjacent cavities and at least one of the end plates are slotted as illustrated in Figure 13 by numeral 208. The slot is wide enough to permit the introduction of the rotor assembly shown in Figure 17. The end plate, in Figure 14 plate 210, does not require a slot since the rotor may be moved into position without such a slot. Bearing 211 may be carried by plate 210 for one end of the shaft while bearing 213 is secured to plate 214 of the frame for supporting the driving end of the shaft. It will be noted that the bearing structure to be bolted to plate 214 extends perpendicularly to the direction of slots 208 so that bearing 213 will have ample support on plate 214.

Good electrical contact between the sides of the cavity and the rotor is secured by wiper clips, one of which is illustrated in Figure 16. These comprise body 216 and curved spring fingers 217 spaced apart as illustrated. These spring fingers are adapted to straddle reduced portions of shaft 218, the bow parts of the spring being adapted to engage shoulders on the shaft as illustrated in Figure 14. Body portions 216 extend along the walls of the cavity and cover slots 208. These spring wipers are soldered to the frame for insuring a good electrical contact. This construction of spring wiper is common in the variable condenser art.

The adjustable coupling means near the high potential of the axial conductor is modified as illustrated in Figures 13 and 15 to dispose the coupling slot 220 on one side only of shaft 218. As illustrated in the drawings, slot 220 has an angular extent of something over 180°. The slot is designed to leave the metal around shaft 218 sufficiently strong mechanically. Cooperating with slot 220 is wiper clip 205′ as shown, this being similar to the construction previously described and necessarily providing excellent electrical contact across the slot.

In both modifications, the slot near the high potential end of the axial conductor is so disposed that the metal on both sides of the slot is generally in series in the current path for the loading capacitors for the two cavities. For example, high frequency currents will flow from the rotor blades in each section along the respective shaft portions toward the common partition walls. The currents will continue from the shaft to the wipers carried by the shaft and thence to the partition wall metal lying between the shaft and slot. The currents will then go along the slot sides and cross over to the partition wall metal outside of the slot and then to the remainder of the cavity. The current cross-over points at the coupling slot will be determined in part by the position of the wiper providing a current path across the slot. While it is believed that this slot and wiper provide inductance, the precise nature of this impedance is not involved.

What is claimed is:

1. A tuner of the coaxial cavity type, said tuner comprising at least two cascaded tuner sections, said sections including metal walls defining two cavities with a common partition wall therebetween, each section having an axial conductor extending for a substantial part of the length of the cavity, metallic means connecting the cavity and one end of said axial conductor to form a low potential end, said axial conductor at the other high potential end having parallel flat faces, a shaft passing through the cavity walls and carrying metal rotor blades for cooperation with the flat faces of the high potential end of said axial conductor in each section, said rotor blades and faces of the axial conductor cooperating to provide capacitive loading for frequency selection in each tuner section, said shaft having means cooperating with the cavity walls for providing a current path between the rotor blades and cavity walls, the partition wall between said cascaded tuner sections being slotted adjacent the low potential end of the cavity and metallic means adjustable along said slot for controlling the amount of coupling through said slot between the adjacent cavities, said metallic means extending across said slot and providing a current path across said slot sides, the position of said current-conducting path determining the degree of coupling between adjacent cavities.

2. A tuner according to claim 1 wherein said slot extends normal to the length of the cavity.

3. A tuner according to claim 2 wherein said adjustable means comprises a bolt threadedly secured in said partition and engaging the edges of the partition wall at the slot sides.

4. The construction according to claim 1 wherein said slot extends normal to the length of the cavity and said adjustable means comprises a metal clip slidable along said slot for controlling the coupling.

5. A tuner of the cavity type having a coaxial conductor, said tuner comprising at least two cascaded tuner sections, metal walls defining the cavities for said two sections and including a partition wall between said cavities, an axial conductor for each tuner section, means for mounting said axial conductor so that it extends the length of the cavity, low impedance means connecting one end of the cavity to one end of said axial conductor to establish a low potential end, each axial conductor at the other end having flat side faces, a shaft carrying rotor blades for cooperation with said flat faces of each axial conductor, said rotor blades cooperating with said flat faces to provide capacitive loading for each cavity section, said shaft passing through the partition wall between adjacent tuner cavities, said shaft having means cooperating with the cavity walls for providing a current path between the rotor blades and cavity walls, said means including partition wall portions having at least one elongated slot therebetween to dispose said partition wall portions in series for said current path, and a metal member contacting the partition metal across said slot adjustable along said slot to control the length of the current path, said metal member providing a current path across the slot, the position of said current path determining the degree of coupling between adjacent cavities.

6. The construction according to claim 5 wherein said slot is generally arcuate around said shaft.

7. The construction according to claim 5 wherein said metal member is rotatably secured to said partition wall.

8. The construction according to claim 5 wherein said metal member comprises a metal clip which may be bridged across the slot and wherein said metal clip is slidable along the slot to move the same to a desired position.

9. A tuner of the coaxial type having a cavity for each section and having an axial conductor within the cavity, said tuner comprising at least two cascaded tuner sections, metal walls defining the tuner sections with a common partition wall separating adjacent tuner sections, each tuner section having an axial conductor extending the length of the cavity from the low potential end to the high potential end thereof, low impedance means at the low potential end for connecting the axial conductor and the cavity wall, the high potential end of each axial conductor having flat parallel side faces, a shaft rotatably secured in the cavity walls and passing through the partition wall, said shaft carrying rotor blades for each tuner section, the metal walls being slotted to permit the shaft and rotor to be moved into position, the rotors for each section cooperating with the flat faces of each axial conductor, spring metal wipers cooperating with the shaft for grounding the same to a part of the partition wall in the shaft vicinity, said partition part having an elongated slot between it and the rest of the partition wall to lengthen the metallic paths for current flow of the adjacent sections and a metal member bridged across said slot and adjustable along said slot for varying the effective length of said current path thereby controlling the coupling between tuning sections.

10. A tuner according to claim 9 wherein said common partition wall is provided with a slot near the low potential end of the cavity and wherein metal means extending across said low potential slot are provided, said metal means being movable along said slot to control the coupling provided at said low potential slot.

11. The tuner according to claim 9 wherein said elongated slot is curved around said shaft.

12. The tuner according to claim 9 wherein said elongated slot is curved around said shaft and wherein said common partition wall is provided with a slot extending generally normal to the length of the cavity near the low potential end of the cavity and wherein a metal member extending across said slot sides is provided, said metal member being movable along said slot to control the coupling at said low potential slot.

13. A tuner of the coaxial cavity type, said tuner comprising at least two cascaded tuner sections, said sections including metal walls defining a cavity with a common partition wall between the cascaded sections, each section having an axial conductor extending for a substantial length of the cavity, metallic means connecting the cavity and one end of said axial conductor to form a low potential end, said axial conductor at the other high potential end having parallel flat side faces, a shaft passing through the cavity walls and carrying metal rotor blades for cooperation with the flat faces of the high potential end of said axial conductor in each section, said rotor blades and faces of the axial conductor cooperating to provide capacitive loading for frequency selection in each tuner section, said shaft having means cooperating with the cavity walls for providing a current path between the rotor blades and cavity walls, said means including partition wall portions having at least one slot therebetween to dispose said partition wall portions in series for said current path, the partition wall between said cascaded tuner sections being slotted adjacent the low potential end of the cavity and normal to the cavity length and metallic means independently adjustable along said slots for controlling the coupling characteristics between the adjacent cavities, said metallic means providing current-conducting paths across said slots, the positions of said current-conducting paths determining the degree of coupling between adjacent cavities.

14. A tuner according to claim 13 wherein the adjustable means for the low potential slot comprises a bolt threadedly secured in said partition and engaging the edges of the partition wall at the slot sides.

15. The construction according to claim 13 wherein said adjustable means comprise metal clips slidable along said slots.

16. The construction according to claim 13 wherein said elongated slot at the high potential end of the cavity is generally curved around said shaft.

17. The construction according to claim 13 wherein said elongated slot at the high potential end of the cavity is generally curved around said shaft and wherein said metallic means comprise metal clips which are bridged across the slots and are slidable along the slots.

References Cited in the file of this patent

UNITED STATES PATENTS

| | | |
|---|---|---|
| 2,132,208 | Dunmore | Oct. 4, 1938 |
| 2,465,639 | Edson | Mar. 29, 1949 |
| 2,567,825 | Pound | Sept. 11, 1951 |

OTHER REFERENCES

Tele-Tech, February 1953, "UHF Tuning Devices," Altman et al.